United States Patent
Takaoka et al.

(10) Patent No.: US 10,280,093 B2
(45) Date of Patent: May 7, 2019

(54) WATER TREATMENT METHOD, WATER TREATMENT APPARATUS, AND NON-TRANSITORY COMPUTER-READABLE RECORDING MEDIUM STORING PROGRAM

(71) Applicant: Panasonic Intellectual Property Management Co., Ltd., Osaka (JP)

(72) Inventors: Tomoyasu Takaoka, Osaka (JP); Yasuhiro Hashimoto, Nara (JP); Daisuke Ino, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 223 days.

(21) Appl. No.: 15/258,693

(22) Filed: Sep. 7, 2016

(65) Prior Publication Data

US 2017/0088438 A1 Mar. 30, 2017

(30) Foreign Application Priority Data

Sep. 25, 2015 (JP) .................................. 2015-188512

(51) Int. Cl.
*C02F 1/44* (2006.01)
*C02F 1/32* (2006.01)
(Continued)

(52) U.S. Cl.
CPC ................ *C02F 1/008* (2013.01); *C02F 1/32* (2013.01); *C02F 1/44* (2013.01); *C02F 1/725* (2013.01);
(Continued)

(58) Field of Classification Search
CPC ...... B01J 20/267; B01J 20/3425; C02F 1/285; C02F 2101/20; C02F 2303/16; C08G 73/0266
See application file for complete search history.

(56) References Cited

U.S. PATENT DOCUMENTS 5,462,674 A * 10/1995 Butters .................... C02F 1/325
 210/321.69
5,862,449 A * 1/1999 Bischoff ................. C02F 1/325
 422/186.3

(Continued)

FOREIGN PATENT DOCUMENTS

JP 2-298393 12/1990

*Primary Examiner* — Ana M Fortuna
(74) *Attorney, Agent, or Firm* — McDermott Will & Emery LLP

(57) ABSTRACT

A water treatment method includes: introducing an aqueous solution containing impurities into a first tank; irradiating, from a light source, photocatalytic particles with ultraviolet light, to turn the aqueous solution introduced into the first tank into primary post-treatment water with which the impurities have been treated; reducing pressure in a first chamber by a filtering pump to filter the primary post-treatment water with a filtering membrane, the filtering separating the primary post-treatment water into the photocatalytic particles stopped at the filtering membrane and secondary post-treatment water that passes through the filtering membrane and does not contain the photocatalytic particles; measuring concentration of photocatalytic particles in the first tank; measuring the difference in pressure between the first chamber and the second chamber; and when the concentration of the photocatalytic particles is equal to or smaller than the first threshold value and the difference in pressure between the first chamber and the second chamber is greater than the second threshold value, supplying air to the filtering membrane by operating a compressor.

14 Claims, 11 Drawing Sheets

(51) Int. Cl.
  *C02F 1/72*    (2006.01)
  *B01D 61/00*   (2006.01)
  *B01D 63/02*   (2006.01)
  *C02F 1/00*    (2006.01)

(52) U.S. Cl.
  CPC .... *C02F 2209/006* (2013.01); *C02F 2209/03* (2013.01); *C02F 2209/40* (2013.01); *C02F 2305/10* (2013.01); *Y02W 10/37* (2015.05)

(56) References Cited

U.S. PATENT DOCUMENTS

| | | | | |
|---|---|---|---|---|
| 6,585,863 | B2* | 7/2003 | Davydov | C02F 1/30 |
| | | | | 204/157.3 |
| 6,736,976 | B2* | 5/2004 | Kantzas | A61L 9/16 |
| | | | | 210/661 |
| 7,414,009 | B2* | 8/2008 | Tanaka | B01J 21/063 |
| | | | | 502/242 |
| 7,455,775 | B2* | 11/2008 | Suzuki | C02F 3/02 |
| | | | | 210/150 |
| 7,862,728 | B2* | 1/2011 | Yencho | C02F 1/325 |
| | | | | 210/748.01 |
| 9,964,487 | B2* | 5/2018 | Neijzen | G01N 21/552 |
| 9,970,868 | B2* | 5/2018 | Berndt | G01N 21/51 |
| 2014/0151301 | A1 | 6/2014 | Maruo et al. | |
| 2017/0088438 | A1* | 3/2017 | Takaoka | C02F 1/008 |

* cited by examiner

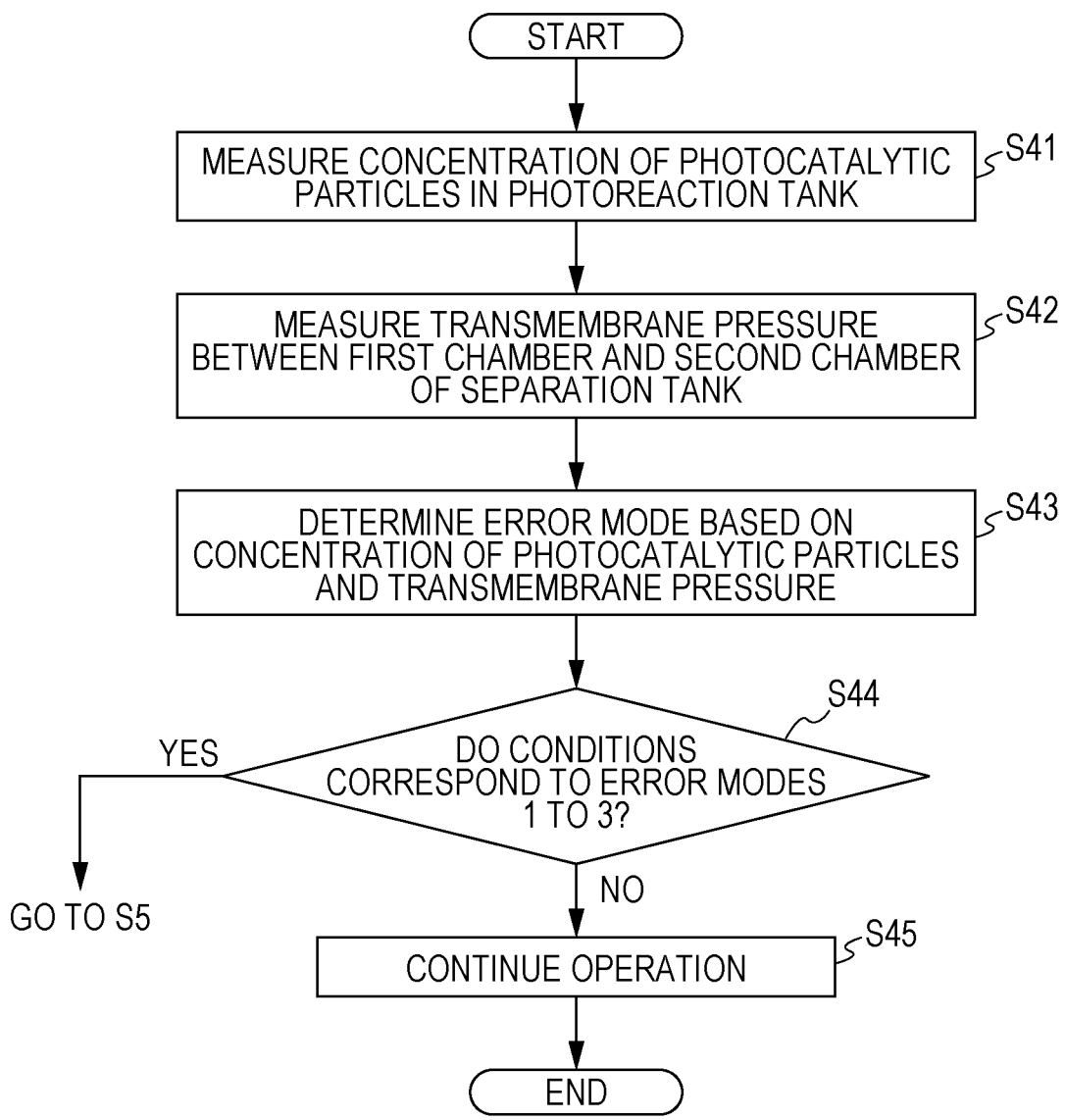

FIG. 7

| | CATALYST CONCENTRATION (c) | TRANSMEMBRANE PRESSURE (Δp) | RECOVERY OPERATION PROCESS |
|---|---|---|---|
| ERROR MODE 0 (NOT CORRESPONDING TO ERROR MODES 1 TO 3) | GREATER THAN FIRST THRESHOLD VALUE ($c > V_{ct}$) | EQUAL TO OR SMALLER THAN SECOND THRESHOLD VALUE ($\Delta p \leq V_{pt}$) | CONTINUE OPERATION NO RECOVERY (OPERATION PROCESS) |
| ERROR MODE 1 | GREATER THAN FIRST THRESHOLD VALUE ($c > V_{ct}$) | GREATER THAN SECOND THRESHOLD VALUE ($\Delta p > V_{pt}$) | ALERT USER TO REPLACE OR REGENERATE MEMBRANE |
| ERROR MODE 2 | EQUAL TO OR SMALLER THAN FIRST THRESHOLD VALUE ($c \leq V_{ct}$) | EQUAL TO OR SMALLER THAN SECOND THRESHOLD VALUE ($\Delta p \leq V_{pt}$) | ALERT USER TO REPLACE OR REGENERATE CATALYTIC PARTICLES |
| ERROR MODE 3 | EQUAL TO OR SMALLER THAN FIRST THRESHOLD VALUE ($c \leq V_{ct}$) | GREATER THAN SECOND THRESHOLD VALUE ($\Delta p > V_{pt}$) | PERFORM INTERMITTENT OPERATION |

FIG. 11

| CATALYST CONCENTRATION (c) | | TRANSMEMBRANE PRESSURE ($\Delta p$) | |
|---|---|---|---|
| | | EQUAL TO OR SMALLER THAN SECOND THRESHOLD VALUE ($\Delta p \leq V_{pt}$) | GREATER THAN SECOND THRESHOLD VALUE ($\Delta p > V_{pt}$) |
| EQUAL TO OR SMALLER THAN FIRST THRESHOLD VALUE ($c \leq V_{ct}$) | | OK (ERROR MODE 0) | CLOGGED WITH CONTAMINATING SUBSTANCE →REPLACE OR REGENERATE MEMBRANE (ERROR MODE 1) |
| GREATER THAN FIRST THRESHOLD VALUE ($c > V_{ct}$) | | PARTICLES INCREASED IN WEIGHT PRECIPITATE →REPLACE OR REGENERATE CATALYST (ERROR MODE 2) | CAKE LAYER (ERROR MODE 3) |

WATER TREATMENT METHOD, WATER TREATMENT APPARATUS, AND NON-TRANSITORY COMPUTER-READABLE RECORDING MEDIUM STORING PROGRAM

BACKGROUND

1. Technical Field

The present disclosure relates to a water treatment method, a water treatment apparatus, and a non-transitory computer-readable recording medium storing a program, each using photocatalytic particles.

2. Description of the Related Art

Titanium oxide irradiated with ultraviolet light is highly oxidative. Accordingly, what is proposed in recent years is a water treatment apparatus using microparticles of titanium dioxide as a photocatalyst (e.g., PTL 1).

PTL 1 discloses a water treatment apparatus in which microparticles of titanium dioxide or the like suspended in treatment-target water are caused to pass around an ultraviolet lamp, so that the treatment-target water is disinfected.

CITATION LIST

Patent Literature

PTL 1: United States Patent Application Publication No. 2014/0151301

However, while the above-noted conventional technique discloses separating and collecting titanium dioxide microparticles and the like contained in the post-treatment water, it does not discuss addressing a reduction in water treatment efficiency that occurs when the water treatment apparatus continuously operates.

Hence, the conventional technique cannot specify the cause of a reduction in water treatment efficiency and cannot perform a proper operation for recovering the water treatment function corresponding to the cause.

SUMMARY

In one general aspect, the techniques disclosed here feature a water treatment method using a water treatment apparatus that treats impurities, the method comprising:
(a) providing the water treatment apparatus including:
a first tank that stores slurry containing photocatalytic particles;
a light source that irradiates the photocatalytic particles with ultraviolet light;
a channel;
a second tank that is connected to the first tank via the channel;
a filtering pump that reduces pressure in the first chamber;
a catalyst concentration meter that measures concentration of the photocatalytic particles in the first tank;
a first pressure gage that measures the pressure in the first chamber;
a second pressure gage that measures pressure in the second chamber; and
a compressor that supplies air, wherein
the second tank comprises a membrane;
the second tank comprises a first chamber and a second chamber in the inside thereof;
the membrane forms a boundary between the first chamber and the second chamber in such a manner that the first chamber is surrounded by the second chamber; and
at least a part of the membrane is formed of a filtration membrane;
(b) introducing an aqueous solution containing impurities into the first tank;
(c) irradiating, from the light source, the photocatalytic particles with ultraviolet light, to turn the aqueous solution into primary post-treatment water with which the impurities have been treated;
(d) filtrating the primary post-treatment water with the filtering membrane while air is supplied at a first flow rate from the compressor to the second tank and the first chamber is depressurized with the filtering pump, so that the primary post-treatment water is separated into the photocatalytic particles remained on the filter and secondary post-treatment water which has passed through the filtering membrane; wherein
the secondary post-treatment water does not contain the photocatalytic particles; and
the secondary post-treatment water is included in the first chamber;
(e) measuring the concentration of the photocatalytic particles in the first tank, the pressure in the first chamber, and the pressure in the second chamber; and
(f) determining whether or not a first requirement is satisfied that the concentration of the photocatalytic particles is not more than a first threshold value and that a difference between the pressure in the first chamber and the second chamber in the second chamber is greater than a second threshold value; and
(g) supplying the air at a second flow rate of not less than the first flow rate from the compressor to the second tank, when the first requirement is satisfied.

The water treatment method and the like of the present disclosure enable to efficiently determine an error that occurs in a continuous operation of the water treatment apparatus by measuring the catalyst concentration and the transmembrane pressure, and to perform a proper recovery operation process.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 6 is a diagram showing a detailed operation flow of an error determination process in the water treatment apparatus according to the exemplary embodiment;

FIG. 7 is a diagram showing error modes and recovery operation processes thereof with the water treatment apparatus according to the exemplary embodiment;

FIG. 11 is a diagram showing an error mode determination table of the water treatment apparatus according to the exemplary embodiment.

DETAILED DESCRIPTION (Underlying Knowledge Forming Basis of the Present Disclosure)

There are a plurality of factors in a reduction in water treatment efficiency of a water treatment apparatus. They may include deterioration of the photocatalyst, deposition of the photocatalyst on the filtering membrane, and the like. The inventors of the present disclosure have devised a water treatment apparatus that suppresses a reduction in water treatment efficiency during water treatment, specifies the cause of the reduction in water treatment efficiency out of a plurality of factors, and performs a proper improving process (recovery operation process). PTL 1 is silent about the necessity of determining a plurality of factors in a reduction in water treatment efficiency during water treatment performed by the water treatment apparatus.

Exemplary Embodiment

[Structure of Water Treatment Apparatus 1]

Figure 1:
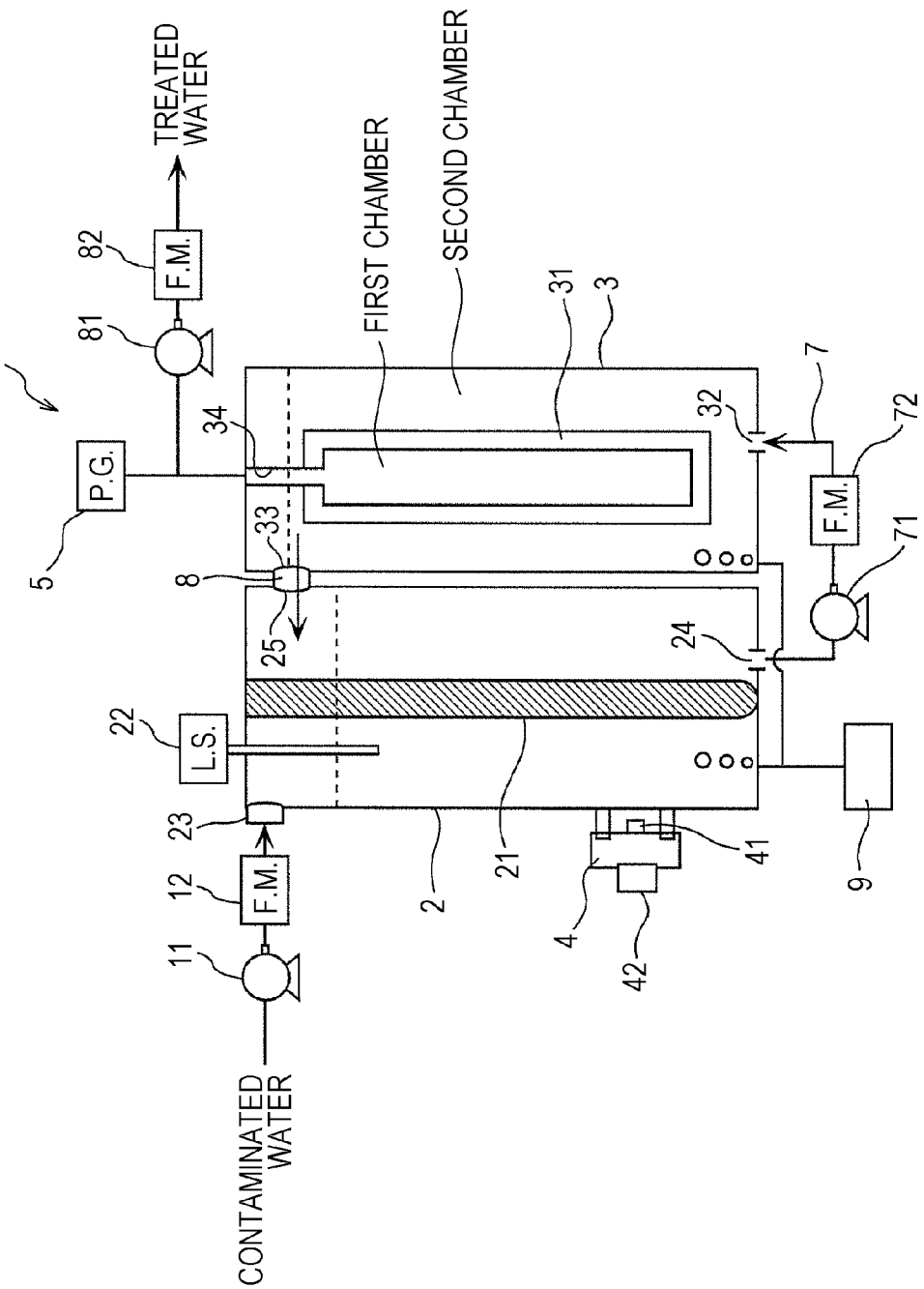
FIG. 1 is a schematic cross-sectional view of a water treatment apparatus according to an exemplary embodiment.

FIG. 1 is a schematic cross-sectional view of water treatment apparatus 1 according to an exemplary embodiment. Water treatment apparatus 1 shown in FIG. 1 includes at least photoreaction tank 2, separation tank 3, catalyst concentration meter 4, pressure gage 5, recovery operation processor 6 (not shown), channel 7, returning passage 8, compressor 9, light source 21, filtering membrane 31, circulating pump 71, and filtering pump 81.

<Photoreaction Tank 2>

As shown in FIG. 1, light source 21 and water level gauge 22 are mounted on photoreaction tank 2. Further, photoreaction tank 2 has contaminated water inlet 23, first outlet 24 connected to channel 7, and first inlet 25 connected to returning passage 8. Photoreaction tank 2 is also referred to as the first tank.

In the present exemplary embodiment, photoreaction tank 2 stores slurry containing photocatalytic particles. Further, into photoreaction tank 2, slurry that contains impurities, i.e., contaminated water, is introduced from contaminated water inlet 23 using introducing pump 11 such as a tube pump. In the present specification, the impurities mean substances that are harmful to human as drinking water. The impurities are, for example, metal including trivalent arsenic or hexavalent chromium, organic materials contained in pharmaceuticals or agricultural chemicals, or any substance containing microbes. The contaminated water is slurry in which impurities are dissolved.

The photocatalytic particles are, for example, titanium dioxide, or titanium dioxide coupled to particles of zeolite or the like. The photocatalytic particles treat impurities contained in contaminated water by a photocatalytic reaction which takes place by radiation of light. More specifically, the photocatalytic particles treat impurities contained in slurry (contaminated water) that is introduced into photoreaction tank 2, so that the slurry (contaminated water) becomes primary post-treatment water. Note that, the primary post-treatment water is an aqueous solution that contains photocatalytic particles and post-treatment impurities, and discharged from the first outlet 24 to the channel 7.

Here, a detailed description will be given of a photocatalytic reaction of photocatalytic particles. When titanium dioxide is irradiated with light in an ultraviolet wavelength range, excited electrons and positive holes are generated in the titanium dioxide. Further, a reaction between the positive holes and water molecules generates hydroxyl radicals (reactive oxygen species) that are highly oxidative. The generated excited electrons and reactive oxygen species causes an oxidation-reduction reaction with impurities. This decomposes the poisonous substance such as organic materials contained in pharmaceuticals or agricultural chemicals and microbes, thereby facilitating removal of the poisonous metal. Exemplary schemes of facilitating removal of the poisonous metal include the generated reactive oxygen species turning trivalent arsenic to pentavalent arsenic thereby facilitating absorption, and the generated excited electrons turning hexavalent chromium to trivalent chromium thereby precipitating. In this manner, the photocatalytic particles can treat impurities by a photocatalytic reaction which takes place by radiation of light. Note that, after the poisonous metal is turned to the state where removal thereof is facilitated (after treatment), the poisonous metal is removed by absorption, precipitation and the like in other operations.

Further, concentrated water in separation tank 3, that is, slurry in which secondary post-treatment water is separated from the primary post-treatment water and in which the concentration of the photocatalytic particles is increased, is introduced (returned) into photoreaction tank 2 from first inlet 25.

<Light Source 21>

Light source 21 is, for example, a low pressure mercury lamp, a medium pressure mercury lamp, a high pressure mercury lamp, an excimer lamp, a xenon lamp, sunbeam, a black light, or an LED.

In the present exemplary embodiment, as shown in FIG. 1, light source 21 is disposed inside photoreaction tank 2, and has a circular cylindrical shape which is continuous from the upper surface to the bottom surface of photoreaction tank 2. Light source 21 irradiates the photocatalytic particles with ultraviolet light, for example. More specifically, light source 21 irradiates the photocatalytic particles in photoreaction tank 2 with light in an ultraviolet wavelength range. The ultraviolet wavelength range is, for example, from 200 nm to 400 nm inclusive. Light source 21 may emit any of monochromatic light and continuous light.

Note that, light source 21 is not being limited to be disposed inside photoreaction tank 2. Light source 21 may be disposed outside photoreaction tank 2. In this case, light source 21 should be capable of emitting light toward the photocatalytic particles in photoreaction tank 2 transmitting through the material of photoreaction tank 2.

<Separation Tank 3>

As shown in FIG. 1, separation tank 3 has filtering membrane 31, a first chamber surrounded by filtering membrane 31, and a second chamber not surrounded by filtering membrane 31. In more detail, filtering membrane 31 forms boundary between the first chamber and the second chamber in such a manner that the first chamber is surrounded by the second chamber. All of the boundary between then first chamber and then second chamber is not filtering membrane 31. A part of the boundary may be filtering membrane 31. Separation tank 3 is also referred to as the second tank. Further, separation tank 3 has second inlet 32 connected to channel 7, second outlet 33 connected to returning passage 8, and treated water outlet 34. Separation tank 3 is connected to photoreaction tank 2 via second inlet 32 and channel 7. The primary post-treatment water is supplied from photoreaction tank 2 to separation tank 3 via channel 7 and second inlet 32. The second chamber stores the primary post-treatment water.

Filtering membrane 31 is, for example, a hollow fiber membrane or a flat membrane, and has a plurality of pores being smaller in diameter than the above-described photocatalytic particles. Filtering membrane 31 divides the inside of separation tank 3 into the first chamber and the second chamber.

The first chamber is the region surrounded by filtering membrane 31 inside separation tank 3, and has treated water outlet 34. The second chamber is the region except for the first chamber and filtering membrane 31 inside separation tank 3 (the region not surrounded by filtering membrane 31), and has second inlet 32 and second outlet 33.

By filtering pump 81 reducing the pressure in the first chamber, filtering membrane 31 can separate the primary post-treatment water stored in the second chamber into the photocatalytic particles stopped at filtering membrane 31 and the secondary post-treatment water that passes through filtering membrane 31 and does not contain the photocatalytic particles. That is, filtering the primary post-treatment water with filtering membrane 31 stops the photocatalytic particles at filtering membrane 31. Accordingly, in the first chamber, the secondary post-treatment water having passed through filtering membrane 31 and not containing the photocatalytic particles is stored. By filtering pump 81 further reducing the pressure in the first chamber, the secondary post-treatment water stored in the first chamber is discharged as treated water outside water treatment apparatus 1 from treated water outlet 34. Further, since the photocatalytic particles are stopped at the filtering membrane 31, slurry containing the photocatalytic particles of a high concentration (concentrated water) is stored in the second chamber of separation tank 3. Accordingly, separation tank 3 discharges (returns) the concentrated water, which is slurry as a result of separating the secondary post-treatment water from the primary post-treatment water and contains the photocatalytic particles of an increased concentration, to returning passage 8 from second outlet 33.

In this manner, in separation tank 3, filtering with filtering membrane 31 can extract the secondary post-treatment water not containing the photocatalytic particles from the primary post-treatment water. More specifically, in separation tank 3, by filtering pump 81 reducing pressure inside filtering membrane 31 (the first chamber) in the state where filtering membrane 31 is immersed in the primary post-treatment water stored in the second chamber, the secondary post-treatment water not containing the photocatalytic particles can be drawn into the first chamber. This is because the photocatalytic particles contained in the primary post-treatment water is greater in diameter than the pores of filtering membrane 31, and therefore the photocatalytic particles cannot pass filtering membrane 31.

<Channel 7 and Returning Passage 8>

As described above, photoreaction tank 2 and separation tank 3 are connected to each other via channel 7 and returning passage 8.

More specifically, channel 7 connects first outlet 24 of photoreaction tank 2 and second inlet 32 of separation tank 3 to each other. Further, in channel 7, circulating pump 71 and circulation flowmeter 72, whose description will be given later, are disposed. Channel 7 transfers, with circulating pump 71, the primary post-treatment water discharged from first outlet 24 of photoreaction tank 2, to second inlet 32 of separation tank 3.

Returning passage 8 connects first inlet 25 of photoreaction tank 2 and second outlet 33 of separation tank 3 to each other. The water level of separation tank 3 is adjusted to be higher than that of photoreaction tank 2. Accordingly, the concentrated water discharged from second outlet 33 of separation tank 3 is transferred through returning passage 8 to first inlet 25 of photoreaction tank 2.

<Circulating Pump 71>

Circulating pump 71 is disposed in channel 7, and introduces the primary post-treatment water discharged from first outlet 24 of photoreaction tank 2 into second inlet 32 of separation tank 3. Circulating pump 71 is, for example, a tube pump. The tube pump is a know pump, and therefore a detailed description thereof is omitted. In a tube pump, an elastic tube is squeezed with a roller so that liquid can be pushed out.

<Filtering Pump 81>

Filtering pump 81 is disposed in the channel connected to treated water outlet 34, and is a tube pump, for example.

Filtering pump 81 reduces the pressure in the first chamber, thereby causing the photocatalytic particles contained in the primary post-treatment water to stop at filtering membrane 31, and causes the secondary post-treatment water, which is part of the primary post-treatment water and does not contain the photocatalytic particles, to pass through filtering membrane 31. Specifically, filtering pump 81 reduces the pressure inside filtering membrane 31 (the first chamber), thereby drawing the secondary post-treatment water, which is obtained by filtering the primary post-treatment water stored in the second chamber of separation tank 3 with filtering membrane 31, into the first chamber. Since filtering pump 81 continuously reduces the pressure in the first chamber, the secondary post-treatment water stored in the first chamber is discharged as the treated water outside the water treatment apparatus 1 from treated water outlet 34.

In the present exemplary embodiment, filtering pump 81 controls pressure such that the flow rate of the treated water (the secondary post-treatment water) discharged from treated water outlet 34 maintains a constant value. Here, for example, filtering pump 81 may have a filtering pump controller. The filtering pump controller may receive (acquire) information on the flow rate from filtering flowmeter 82 that is disposed in a channel connected to the treated water outlet 34 and measures the flow rate of the discharged secondary post-treatment water, and control itself (filtering pump 81) such that the flow rate maintains a constant value.

<Compressor 9>

Compressor 9 supplies air. In the present exemplary embodiment, compressor 9 in operation supplies air to photoreaction tank 2 and separation tank 3 at a first flow rate and a second flow rate. The first flow rate and the second flow rate means a flow amount per unit time (L/min). The second flow rate is not less than the first flow rate. The first flow rate and the second flow rate is decided depending on an amount of water amount to be treated. An example of the first flow rate is 4 L/min. An example of the second flow rate is 8 L/min. The details of the first flow rate and the second flow rate will be described later. The supplied air agitates the slurry stored in photoreaction tank 2 and separation tank 3. Further, compressor 9 can supply air to filtering membrane 31 of separation tank 3.

<Catalyst Concentration Meter 4>

Figure 2:
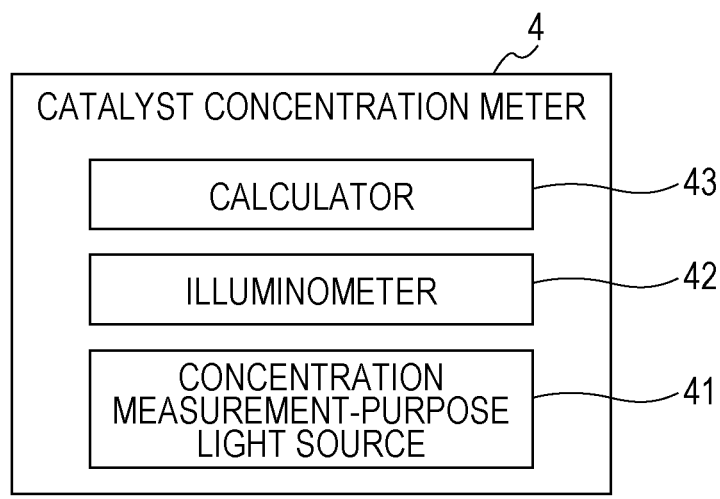
FIG. 2 is a block diagram showing an exemplary functional structure of a catalyst concentration meter according to the exemplary embodiment.

FIG. 2 is a block diagram showing an exemplary functional structure of catalyst concentration meter 4 according to the present exemplary embodiment.

As shown in FIG. 1, catalyst concentration meter 4 is mounted on photoreaction tank 2, and measures the concentration of slurry, that is, the concentration of the photocatalytic particles in photoreaction tank 2.

In the present exemplary embodiment, as shown in FIG. 2, catalyst concentration meter 4 includes concentration measurement-purpose light source 41, illuminometer 42, and calculator 43. Part of slurry in photoreaction tank 2 flows into catalyst concentration meter 4, and concentration measurement-purpose light source 41 and illuminometer 42 face each other with the flow-in slurry interposed between them. Catalyst concentration meter 4 emits light from concentration measurement-purpose light source 41 toward illuminometer 42, so that illuminometer 42 measures the intensity of transmitted light.

Calculator 43 refers to a predetermined concentration determining criterion, and calculates the concentration of the slurry in photoreaction tank 2, that is, the concentration of the photocatalytic particles in photoreaction tank 2 using the intensity of transmitted light measured by illuminometer 42. An exemplary predetermined concentration determining criterion is a relational expression or table associating absorbance and concentration with each other. In this case, calculator 43 can calculate absorbance using the intensity of transmitted light and the intensity of light output from concentration measurement-purpose light source 41. Accordingly, calculator 43 can calculate the concentration that meets the concentration determining criterion and corresponds to the calculated absorbance. Further, other exemplary predetermined concentration determining criterion is relational expression or table associating the intensity of transmitted light and concentration with each other. In this case, calculator 43 can calculate the concentration that meets the concentration determining criterion and corresponds to the intensity of transmitted light measured by illuminometer 42.

According to the Lambert-Beer law, intensity of light l having transmitted through a medium is expressed by the following (Equation 1). Therefore, by measuring the intensity of light l having transmitted through a medium, the molarity of the medium can be obtained. That is, according to the Lambert-Beer law, using the intensity of transmitted light measured by illuminometer 42, the concentration of the photocatalytic particles in photoreaction tank 2 can be calculated.

$$I = Io \cdot \exp(-\varepsilon cl) \quad \text{(Equation 1)}$$

where Io is intensity of light before being incident on the medium, □ is the molar absorbance coefficient, c is the molarity of the medium, and l is the length of the medium.

<Pressure Gage 5>

Pressure gage 5 corresponds to, for example, a first pressure gage and a second pressure gage, and measures the pressure in the first chamber and the pressure in the second chamber. In the present exemplary embodiment, as shown in FIG. 1, pressure gage 5 is disposed at a channel between filtering membrane 31 and filtering pump 81, and measures the difference in pressure between the first chamber and the second chamber, that is, the pressure applied on filtering membrane 31 (the transmembrane pressure). Here, pressure gage 5 is, for example, a differential pressure gage, and monitors the difference relative to the atmospheric pressure. This is because the second chamber is opened to the atmosphere, and therefore the pressure therein is substantially equal to the atmospheric pressure. For example, when the atmospheric pressure is 100 kPa and the pressure in the first chamber is 90 kPa, filtering membrane 31 can filter the slurry with the transmembrane pressure of 10 kPa. While the detailed description will be given later, when filtering membrane 31 deteriorates, the pressure in the first chamber must be reduced to 80 kPa to obtain the transmembrane pressure of 20 kPa for filtering.

<Recovery Operation Processor 6>

Figure 3:
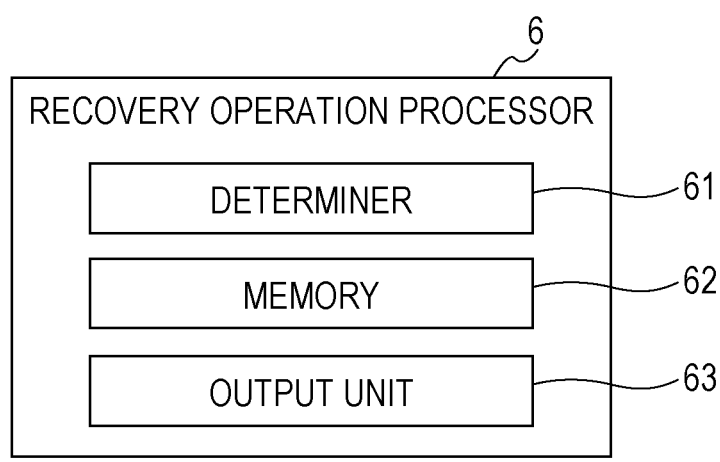
FIG. 3 is a block diagram showing an exemplary functional structure of a recovery operation processor according to the exemplary embodiment.

FIG. 3 is a block diagram showing an exemplary functional structure of recovery operation processor 6 according to the present exemplary embodiment.

Recovery operation processor 6 is connected to pressure gage 5 and catalyst concentration meter 4 via wire or wirelessly, and capable of acquiring a measurement result from each of pressure gage 5 and catalyst concentration meter 4. Accordingly, recovery operation processor 6 may be mounted on water treatment apparatus 1 shown in FIG. 1, or may be installed remotely from water treatment apparatus 1.

In the present exemplary embodiment, as shown in FIG. 3, recovery operation processor 6 includes determiner 61, memory 62, and output unit 63.

<Determiner 61>

Determiner 61 refers to the determining criterion stored in memory 62. Determiner 61 acquires the concentration of the photocatalytic particles measured by catalyst concentration meter 4, and the difference in pressure between the first chamber and the second chamber measured by pressure gage 5.

Determiner 61 determines the error mode of water treatment apparatus 1 based on the acquired concentration of photocatalytic particles and the acquired difference in pressure between the first chamber and the second chamber, and determines whether or not to perform a recovery operation process. Specifically, the determiner 61 refers to the determining criterion, and determines whether or not the acquired concentration of photocatalytic particles is higher than a first threshold value, and whether or not the acquired difference in pressure between the first chamber and the second chamber is lower than a second threshold value, thereby determining whether the situation corresponds to an error mode. Here, in view of efficiency of treating contaminated water at photoreaction tank 2, the first threshold value may be set to about half (0.5 times) the initial concentration of the photocatalytic particles in photoreaction tank 2. Further, in view of the power consumption of filtering pump 81 and safety, the second threshold value may be set to about twice the initial pressure in the first chamber.

When determiner 61 determines that, for example, the concentration of the photocatalytic particles in photoreaction tank 2 is equal to or smaller than the first threshold value, and the difference in pressure between the first chamber and the second chamber of separation tank 3 is greater than the second threshold value, determiner 61 outputs to compressor 9 an operational signal to cause compressor 9 to supply air to filtering membrane 31. Here, it is also possible that, when determiner 61 determines that the concentration of the photocatalytic particles in photoreaction tank 2 is equal to or smaller than the first threshold value and the difference in pressure between the first chamber and the second chamber of separation tank 3 is greater than the second threshold value, and further determines that the concentration of the photocatalytic particles in photoreaction tank 2 after a predetermined period is equal to or smaller than the first threshold value and the difference in pressure between the first chamber and the second chamber of separation tank 3 after the predetermined period is greater than the second threshold value, determiner 61 outputs to compressor 9 an operational signal to cause compressor 9 to supply air to filtering membrane 31. Determiner 614 may determine an operation signal to be output to compressor with reference to the first flow rate and the second flow rate memorized in the memory 62.

Further, for example, determiner 61 may determine whether or not to output information on replacement of the photocatalytic particles or information on regeneration of filtering membrane 31, based on the acquired concentration of the photocatalytic particles in photoreaction tank 2 and the acquired difference in pressure between the first chamber and the second chamber of separation tank 3. Note that, determiner 61 may determine whether or not to output information on replacement of the photocatalytic particles or information on regeneration of filtering membrane 31, based on the concentration of the photocatalytic particles and the difference in pressure between the first chamber and the second chamber acquired at a first time and at a second time after a predetermined period from the first time.

More specifically, when determiner 61 determines that the acquired concentration of the photocatalytic particles of photoreaction tank 2 is equal to or smaller than the first threshold value, and the acquired difference in pressure between the first chamber and the second chamber of separation tank 3 is equal to or smaller than the second threshold value, determiner 61 may determine that the replacement of the photocatalytic particles is necessary and information on replacement of the photocatalytic particles must be output. In this case, determiner 61 causes output unit 63 to output the information on replacement of the photocatalytic particles. Further, when determiner 61 determines that the acquired concentration of the photocatalytic particles in photoreaction tank 2 is greater than the first threshold value and the acquired difference between the first chamber and the second chamber of separation tank 3 is greater than the second threshold value, determiner 61 may determine that regeneration of filtering membrane 31 is necessary and information on regeneration of filtering membrane 31 must be output. In this case, determiner 61 causes output unit 63 to output the information on regeneration of filtering membrane 31.

<Memory 62>

Memory 62 stores the determining criterion of determiner 61. Note that, memory 62 is not necessarily included in recovery operation processor 6, that is, in water treatment apparatus 1, and may be provided outside water treatment apparatus 1.

<Output Unit 63>

Output unit 63 outputs the information on replacement of the photocatalytic particles or the information on regeneration of filtering membrane 31. In the present exemplary embodiment, output unit 63 outputs, based on the determination result of determiner 61, the information on replacement of the photocatalytic particles or the information on regeneration of filtering membrane 31 that determiner 61 determined to output. Here, output unit 63 is a display or a speaker, for example. That is, output unit 63 displays or sounds the information on replacement of the photocatalytic particles or the information on regeneration of filtering membrane 31.

[Operation of Water Treatment Apparatus 1]

Next, a description will be given of the operation of water treatment apparatus 1 structured as described above.

<Water Treatment Flow>

Firstly, with reference to FIGS. 4 and 5, a description will be given of the water treatment flow of water treatment apparatus 1.

Figure 4:
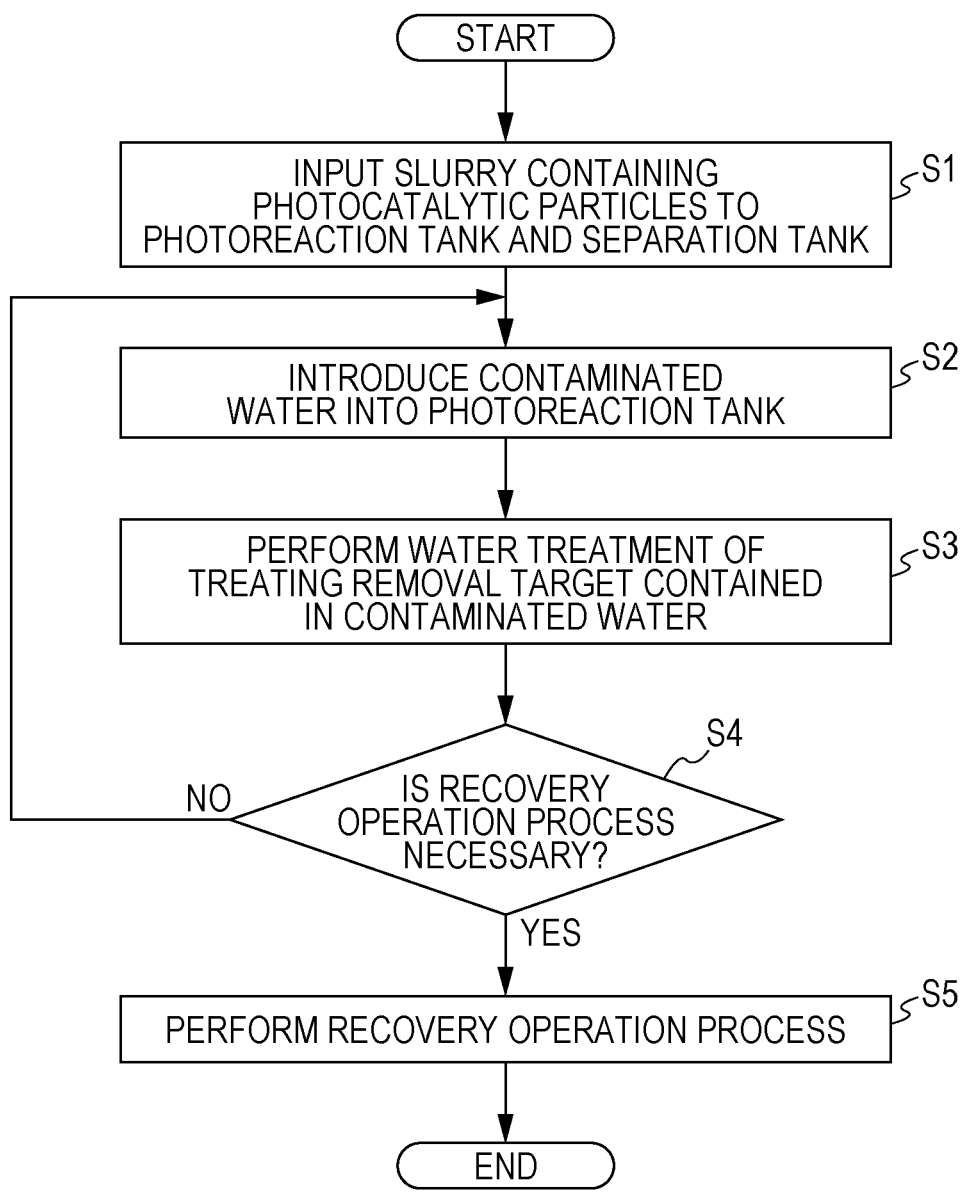
FIG. 4 is a diagram showing the overview of an operation flow of the water treatment apparatus according to the exemplary embodiment.
Figure 5:
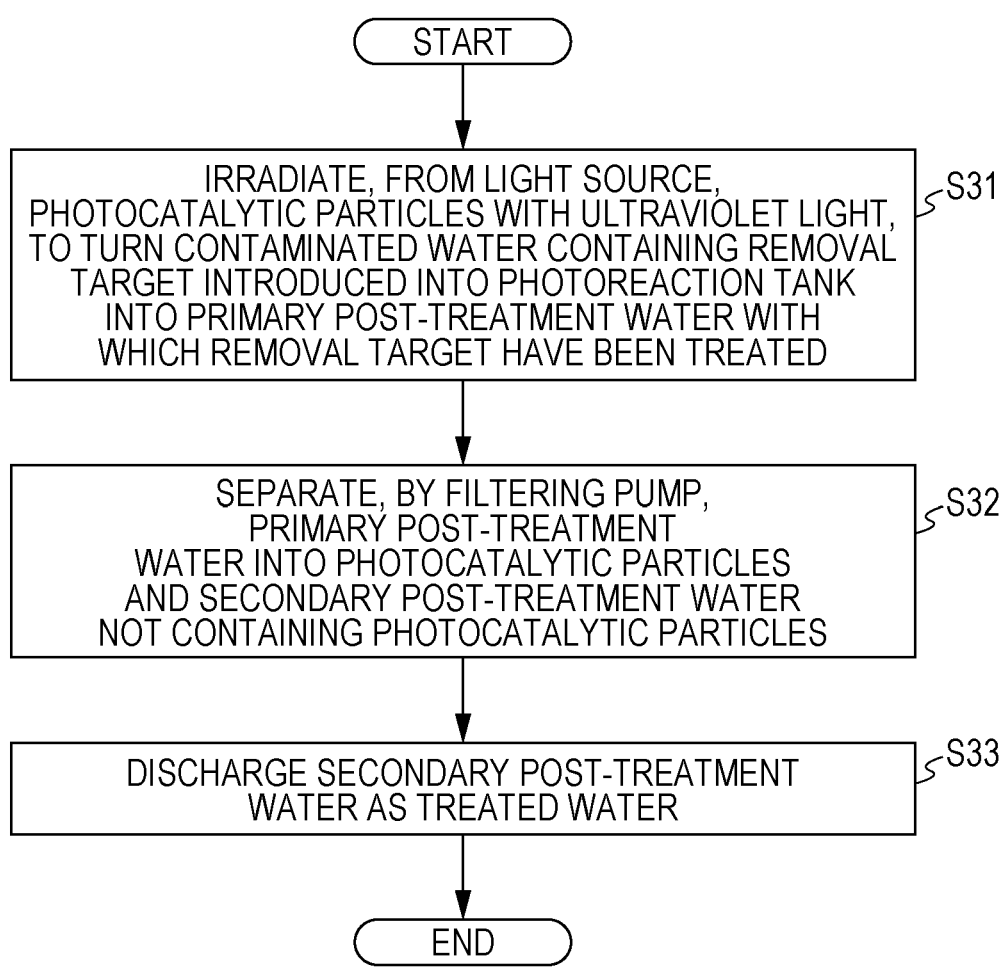
FIG. 5 is a diagram showing an operation flow of water treatment of the water treatment apparatus according to the exemplary embodiment.

FIG. 4 is a diagram showing the overview of the operation flow of water treatment apparatus 1 according to the present exemplary embodiment. FIG. 5 is a diagram showing details of the water treatment flow of the water treatment apparatus according to the present exemplary embodiment.

Firstly, water treatment apparatus 1 is provided. Specifically, the user of water treatment apparatus 1 purchases water treatment apparatus 1.

Next, slurry containing photocatalytic particles is input to photoreaction tank 2 and separation tank 3 (S1). When the slurry is input, compressor 9 operates to send air to photoreaction tank 2 and separation tank 3, to agitate the slurry. Here, compressor 9 supplies air at the first flow rate to photoreaction tank 2 and separation tank 3. Subsequently, circulating pump 71 is turned ON, and the slurry is circulated in photoreaction tank 2. Further, light source 21 is turned ON, and stands by so that an oxidation-reduction reaction by the photocatalyst takes place once contaminated water is introduced into photoreaction tank 2.

Next, the contaminated water is introduced into photoreaction tank 2 (S2). Specifically, the contaminated water is introduced, for example from an external container that stores the contaminated water, into contaminated water inlet 23 of photoreaction tank 2 by introducing pump 11.

Next, since light source 21 is turned ON and the slurry stored in photoreaction tank 2 is irradiated with ultraviolet light, water treatment apparatus 1 performs water treatment, that is, treats impurities contained in the contaminated water (S3). In more detail, as shown in FIG. 5, firstly, water treatment apparatus 1 causes light source 21 to irradiates the photocatalytic particles in photoreaction tank 2 with ultraviolet light, and turns the contaminated water containing impurities introduced into photoreaction tank 2 into the primary post-treatment water from which the impurities have been treated, by a photocatalytic reaction of the photocatalytic particles (S31). The primary post-treatment water is sent to separation tank 3 by circulating pump 71. Subsequently, the primary post-treatment water, which is discharged from photoreaction tank 2 and introduced into separation tank 3 by filtering pump 81 reducing the pressure in the first chamber, is separated by water treatment apparatus 1 into the photocatalytic particles stopped at filtering membrane 31 and the secondary post-treatment water that passes through filtering membrane 31 and contains no photocatalytic particles (S32). Subsequently, water treatment apparatus 1 discharges the secondary post-treatment water as treated water to the outside of water treatment apparatus 1 (S33). The slurry left in separation tank 3 containing the photocatalytic particles of an increased concentration (concentrated water) is returned to photoreaction tank 2 through returning passage 8. Since Steps S31 to S33 are detailed in the foregoing, the description thereof is not repeated.

Next, water treatment apparatus 1 determines whether or not the recovery operation process is necessary (S4).

In Step S4, when it is determined that the recovery operation process is not necessary (Yes in S4), control returns to Step S2. Note that, in this case, by continuously performing Steps S2 and S3, the water treatment can be continuously performed.

On the other hand, in Step S4, when it is determined that the recovery operation process is necessary (No in S4), the recovery operation process is performed (S5).

The error determination process in Step S4 is performed by the above-described determiner 61.

<Error Determination Process and Recovery Operation Process>

Next, with reference to FIGS. 6 and 7, a description will be given of detailed operation flows of an error determination process in water treatment apparatus 1 in Step S4 and a recovery operation process in Step S5 in FIG. 4.

FIG. 6 is a diagram showing a detailed operation flow of the error determination process in water treatment apparatus 1 according to the present exemplary embodiment. FIG. 7 is a diagram showing error modes and recovery operation processes thereof with water treatment apparatus 1 according to the present exemplary embodiment.

As shown in FIG. 6, in Step S4, firstly, water treatment apparatus 1 measures the concentration of the photocatalytic particles in photoreaction tank 2 (S41), and measures the difference in pressure between the first chamber and the second chamber of separation tank 3, that is, the pressure applied on filtering membrane 31 (the transmembrane pressure) (S42). Note that, Step S41 and Step S42 may be reversely or simultaneously performed.

Next, water treatment apparatus 1 determines the error mode of water treatment apparatus 1 based on the concentration of the photocatalytic particles in photoreaction tank 2 and the difference in pressure between the first chamber and the second chamber of separation tank 3 (S43). Then, when the conditions correspond to any of error modes 1 to 3 (Yes in S44), water treatment apparatus 1 determines that a recovery operation process is necessary (Yes in S4 in FIG. 4), and performs the recovery operation process corresponding to the error mode (S5). On the other hand, when the conditions do not correspond to error modes 1 to 3 (No in S44), water treatment apparatus 1 continues its operation (S45).

Here, with reference to FIG. 7, a description will be given of error modes 1 to 3 and the recovery operation processes. In FIG. 7, c represents the concentration of the photocatalytic particles in photoreaction tank 2 measured in Step S41, and $\Delta p$ represents the difference in pressure between the first chamber and the second chamber of separation tank 3 (the transmembrane pressure) measured in Step S42. Vct represents the first threshold value, and Vpt represents the second threshold value.

As shown in FIG. 7, error mode 1 corresponds to the determination that the concentration of the photocatalytic particles in photoreaction tank 2 (c) is greater than the first threshold value (c>Vct) and the transmembrane pressure in the first chamber of the separation tank 3 ($\Delta p$) is greater than second threshold value ($\Delta p$>Vpt). This corresponds to first requirement. Upon the determination of error mode 1, water treatment apparatus 1 outputs to output unit 63 an operational signal that alerts the user to replace or regenerate filtering membrane 31. In Step S5, output unit 63 outputs, as the recovery operation process, information on replacement or regeneration of filtering membrane 31. Note that, water treatment apparatus 1 continues its operation.

Error mode 2 corresponds to the determination that the concentration of the photocatalytic particles in photoreaction tank 2 (c) is equal to or smaller than the first threshold value (c≤Vct) and the transmembrane pressure in the first chamber of separation tank 3 ($\Delta p$) is equal to or smaller than the second threshold value ($\Delta p$≤Vpt). This corresponds to third requirement. Upon the determination of error mode 2, water treatment apparatus 1 outputs to output unit 63 an operational signal that alerts the user to replace or regenerate the photocatalytic particles. In Step S5, output unit 63 outputs, as the recovery operation process, information on replacement or regeneration of the photocatalytic particles. Note that, after the information is output, water treatment apparatus 1 stops its operation.

Error mode 3 corresponds to the determination that the concentration of the photocatalytic particles in photoreaction tank 2 (c) is equal to or smaller than the first threshold value (c≤Vct) and the transmembrane pressure of the first chamber of separation tank 3 ($\Delta p$) is greater than the second threshold value ($\Delta p$>Vpt). This correspond to fourth requirement. Upon the determination of error mode 3, water treatment apparatus 1 outputs to compressor 9 an operational signal to supply air to filtering membrane 31. In Step S5, compressor 9 performs, as the recovery operation process, an intermittent operation. That is, compressor 9 supplies air to filtering membrane 31 of separation tank 3 at prescribed time intervals. Note that, during the recovery operation process of compressor 9, filtering pump 81 stops its operation. At this time, an example of the flow rate of air supplied from compressor 9 to filtering membrane 31 is the first flow rate. Further, during the stop of filtering pump 81, introducing pump 11 also stops its operation. This prevents the total amount of the slurry stored in water treatment apparatus 1 from changing. Then, after a lapse of a predetermined period, introducing pump 11 and filtering pump 81 start their operations.

Alternatively, compressor 9 supplies air to filtering membrane 31 of separation tank 3 at second flow rate, and filtering pump 81 depressurizes the first chamber. In other words, the operation of filtering pump 81 is not stopped. The second flow rate is greater than the first flow rate (See S3). The flow rate supplied at the recovery operation described in S5 is greater than the flow rate supplied at water treatment shown in FIG. 5. This improves the effect of removal of a cake layer.

Error mode 0 corresponds to the conditions not corresponding to error modes 1 to 3, and is not the error mode. More specifically, error mode 0 corresponds to the determination that the concentration of the photocatalytic particles in photoreaction tank 2 (c) is greater than the first threshold value (c>Vct) and the transmembrane pressure of the first chamber of the separation tank 3 ($\Delta p$) is equal to or smaller than the second threshold value ($\Delta p$≤Vpt). In this case, water treatment apparatus 1 does not perform the recovery operation process and continues its operation.

<Relationship Between Catalyst Concentration and Flow Rate>

Water treatment apparatus 1 according to the present exemplary embodiment irradiates the photocatalytic particles dispersed in slurry with excitation light. Thus, as compared to the scheme in which a photocatalyst is used as being fixed to the sidewall of an apparatus or the like, the reaction efficiency is at least decupled.

When the concentration of the photocatalytic particles dispersed in water treatment apparatus 1 reduces, the occurrence of photocatalytic reactions reduces, and hence the reaction efficiency reduces. On the other hand, an excessively high concentration of the photocatalytic particles dispersed in water treatment apparatus 1 reduces the light transmittance of the slurry, and hence the reaction efficiency reduces. Accordingly, in order to maintain the water amount in water treatment apparatus 1 at a constant value, certain relationship must be satisfied among the flow rate with introducing pump 11 (an introducing flow rate), the flow rate with circulating pump 71 (a circulating flow rate), and the flow rate with filtering pump 81 (a filtering flow rate). In the following, the relationship will be described with reference to FIGS. 8 and 9.

Figure 8:
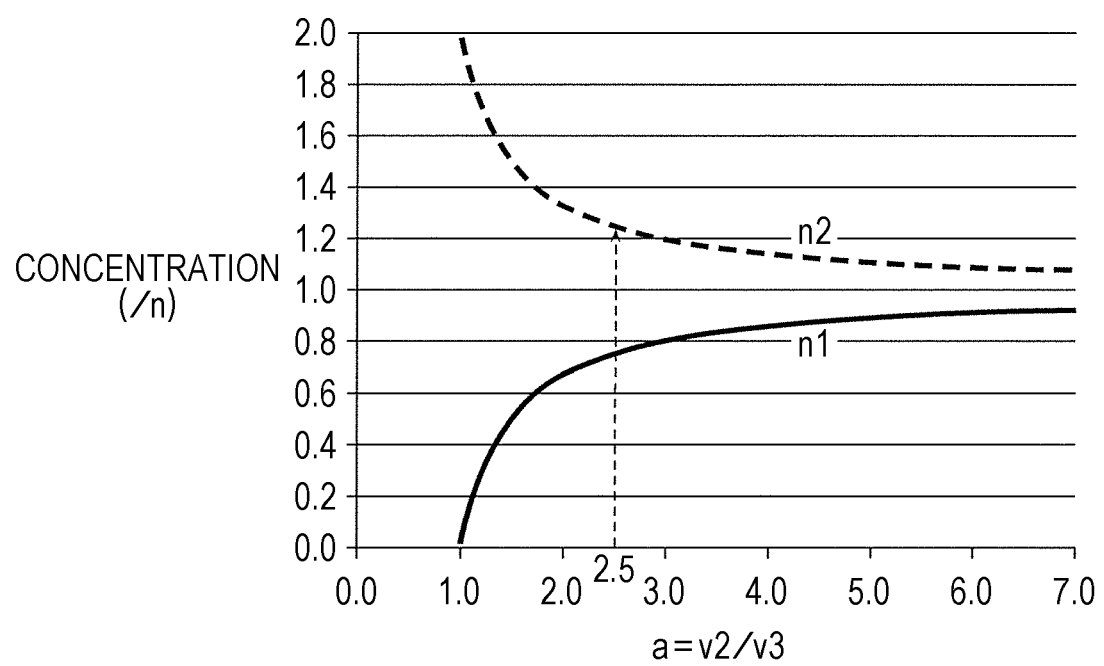
FIG. 8 is a diagram showing the relationship between the catalyst concentration and the flow rate in the water treatment apparatus according to the exemplary embodiment.
Figure 9:
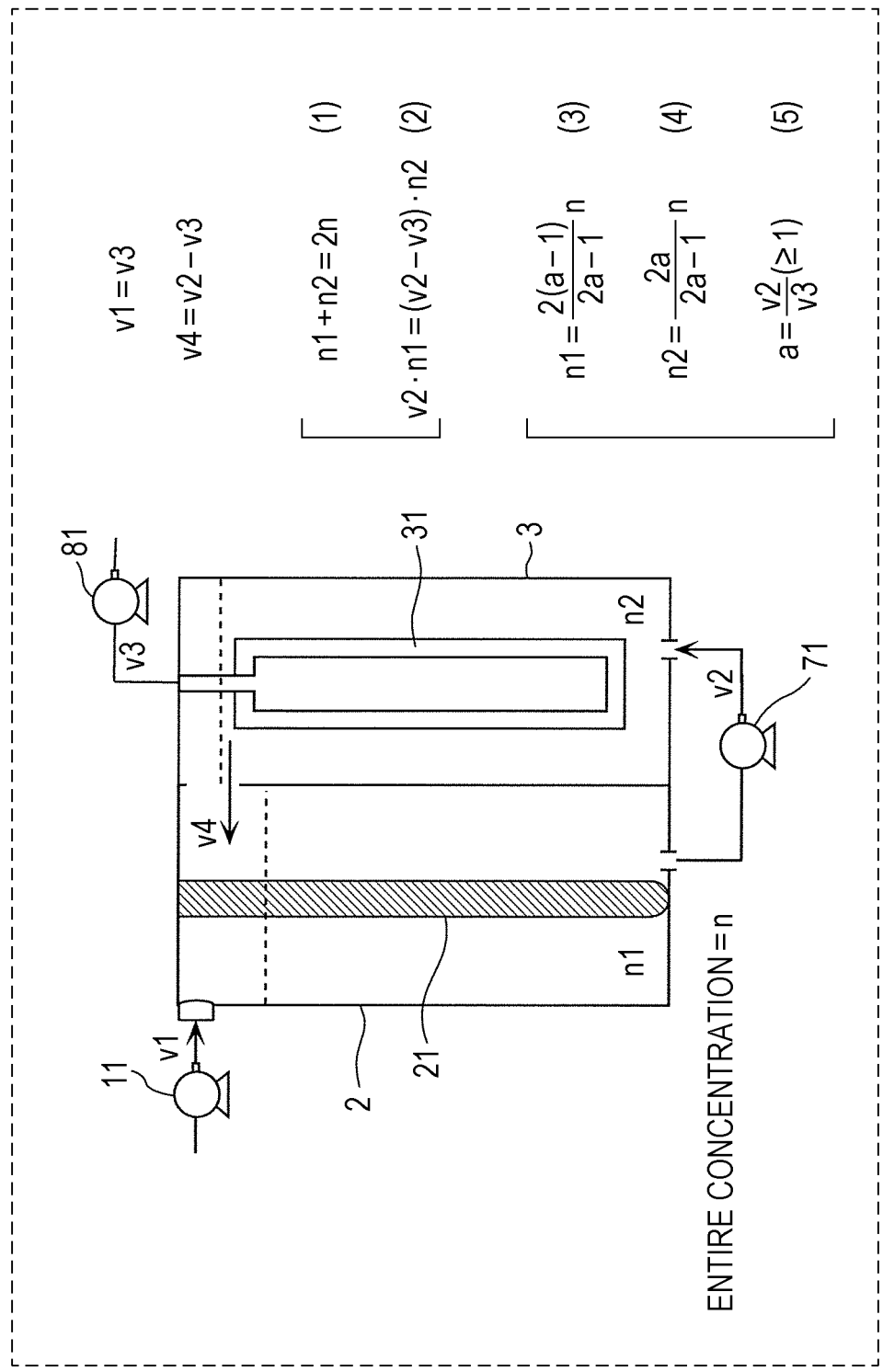
FIG. 9 is a diagram showing relational expressions used for calculating the relationship shown in FIG. 8.

FIG. 8 is a diagram showing the relationship between the catalyst concentration and the flow rate in water treatment apparatus 1 according to the present exemplary embodiment. FIG. 9 is a diagram showing relational expressions used for calculating the relationship shown in FIG. 8.

In order to maintain the water amount in water treatment apparatus 1 in operation at a constant value, flow rate v1 with introducing pump 11 and flow rate v3 with filtering pump 81 must be equalized with each other (v1=v3). Flow rate v4 with circulating pump 71 from separation tank 3 to photoreaction tank 2 is v4=v2−v3≥0. Note that, as shown in FIG. 1, flow rate v1 with introducing pump 11 is measured by introducing flowmeter 12. Flow rate v3 with filtering pump 81 is measured by filtering flowmeter 82. Flow rate v4 with circulating pump 71 is measured by circulation flowmeter 72.

Here, the photocatalyst concentration in the entire water treatment apparatus 1 is n, the photocatalyst concentration in photoreaction tank 2 is n1, and the photocatalyst concentration in separation tank 3 is n2. The photocatalyst concentration in the entire water treatment apparatus 1 is constant, and the concentration in photoreaction tank 2 and in separation tank 3 does not change in the steady state. Accordingly, the following (Equation 2) and (Equation 3) are established. Note that, (Equation 2) and (Equation 3) are based on an assumption that photoreaction tank 2 and separation tank 3 store an equal amount of water.

$$n1+n2=2n \quad \text{(Equation 2)}$$

$$v2 \cdot n1 = (v2-v3) \cdot n2 \quad \text{(Equation 3)}$$

Here, from (Equation 2) and (Equation 3), the following (Equation 4), (Equation 5), and (Equation 6) are derived for n1 and n2.

$$n1 = 2(a-1)/(2a-1) \cdot n \quad \text{(Equation 4)}$$

$$n2 = 2a/(2a-1) \cdot n \quad \text{(Equation 5)}$$

$$a = v2/v3 \geq 1 \quad \text{(Equation 6)}$$

From (Equation 4) to (Equation 6), it can be seen that, in order to increase the treatment capacity of water treatment apparatus 1, flow rate v3 with filtering pump 81 (the filtering flow rate) must be increased. On the other hand, in order to maintain constant catalyst concentration n1 in photoreaction tank 2, flow rate v2 (the circulating flow rate) with circulating pump 71 must be increased by the same proportion.

As has been described in the foregoing, in photoreaction tank 2, light source 21 irradiates the photocatalytic particles such as titanium dioxide with ultraviolet light, whereby hydroxyl radicals and the like are generated. Thus, the contaminating substance can be treated (decomposed and removed). The longer the contaminating substance stays in photoreaction tank 2, the greater the decomposing removal rate by radiation of light from light source 21. However, an increase in flow rate v2 with circulating pump 71 (the circulating flow rate) for increasing the treatment capacity of water treatment apparatus 1 shortens the stay in photoreaction tank 2, which reduces the decomposing removal rate. In view of the foregoing, with water treatment apparatus 1 according to the present exemplary embodiment, flow rate ratio a (=v2/v3) shown in FIG. 8 is set to about 2.5.

Note that, the above-described photocatalyst concentration n1 in photoreaction tank 2 is set to about 1 g/L.

(Underlying Knowledge Forming Basis of the Present Disclosure)

In the following, a description will be given of the underlying knowledge that forms the basis of finding the above-described error modes 1 to 3 and the recovery operation processes corresponding to error modes 1 to 3.

There are various causes of a reduction in water treatment efficiency when water treatment apparatus 1 continuously treat water. Three exemplary causes of a reduction in water treatment efficiency are described below.

(A) The photocatalytic particles coagulating and accumulating on the bottom surface of photoreaction tank 2. In this case, concentration of catalytic particles in photoreaction tank 2 (c) reduces in accordance with the photocatalytic particles accumulating on the bottom surface. Further, the photocatalytic particles accumulated on the bottom surface do not contribute to a photocatalytic reaction. Accordingly, in the case where the photocatalytic particles coagulate and accumulate on the bottom surface of photoreaction tank 2, since the rate of decomposing and removing impurities contained in the contaminated water by a photocatalytic reaction reduces, the water treatment efficiency reduces. Note that, the photocatalytic particles coagulating and accumulating on the bottom surface of photoreaction tank 2 can be identified by a reduction in concentration of catalytic particles in photoreaction tank 2 (c).

(B) The pores of filtering membrane 31 being clogged with any solid material contained in the primary post-treatment water. This hinders filtering membrane 31 from passing the liquid, and reduces the capacity of separating the photocatalytic particles from the primary post-treatment water. Accordingly, in the case where the pores of filtering membrane 31 are clogged with any solid material contained in the primary post-treatment water, the water treatment efficiency reduces. Note that, the pores of filtering membrane 31 being clogged with any solid material can be identified by an increase in transmembrane pressure (the difference in pressure between the first chamber and the second chamber of separation tank 3) of filtering membrane 31.

(C) An accumulation layer (cake layer) of the photocatalytic particles being formed on the surface of filtering membrane 31. This hinders filtering membrane 31 from passing the liquid. Further, since the concentration of the photocatalytic particles in separation tank 3 reduces in accordance with the formed accumulation layer (cake layer) of the photocatalytic particles, the number of photocatalytic particles returned to photoreaction tank 2 reduces, and concentration of catalytic particles in photoreaction tank 2 (c) reduces. Accordingly, in the case where an accumulation layer (cake layer) of the photocatalytic particles is formed on the surface of filtering membrane 31, concentration of catalytic particles in photoreaction tank 2 (c) reduces. Further, since the rate of decomposing and removing impurities contained in the contaminated water by a photocatalytic reaction reduces, the water treatment efficiency reduces.

Thus, while there are the three possible causes (A) to (C) of a reduction in water treatment efficiency, the causes (A) to (C) cannot be identified just by concentration of photocatalytic particles in photoreaction tank 2 (c). Accordingly, in the present exemplary embodiment, the causes are identified using, in addition to concentration of photocatalytic particles in photoreaction tank 2 (c), the transmembrane pressure of filtering membrane 31 (the difference in pressure between the first chamber and the second chamber of separation tank 3). In the following, how cause (C) can also be identified using the transmembrane pressure of the filtering membrane 31 (the difference in pressure between the first chamber and the second chamber of separation tank 3) will be described.

Figure 10:
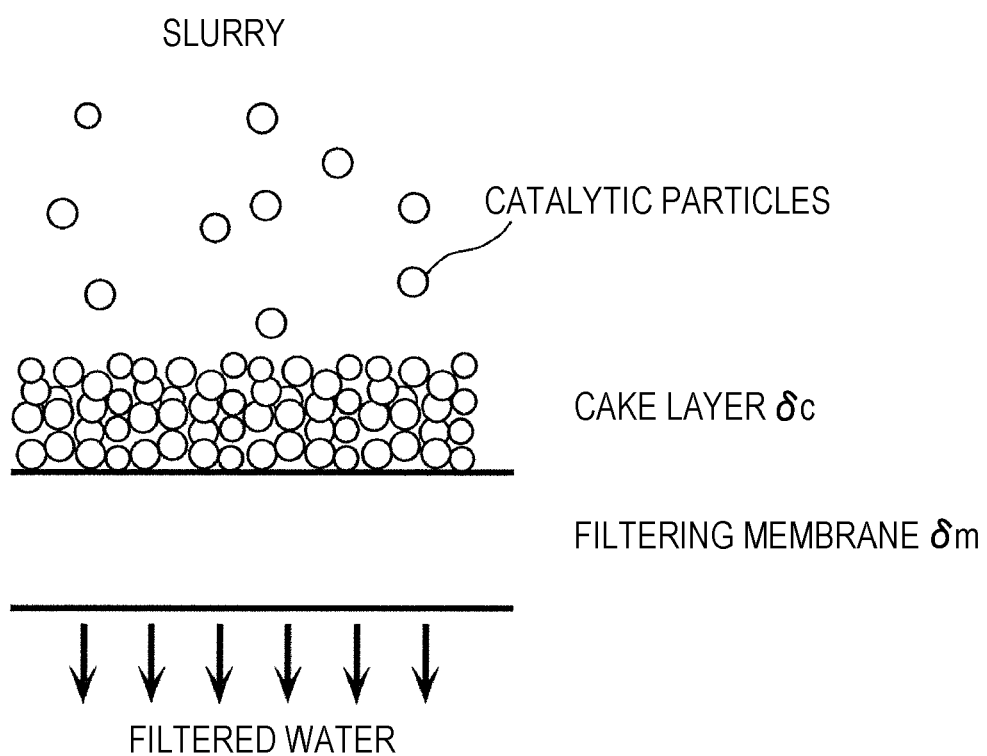
FIG. 10 is a diagram showing a cake layer forming state at a filtering membrane.

FIG. 10 is a diagram showing a cake layer forming state at filtering membrane 31.

In water treatment apparatus 1, as filtering proceeds, an accumulation layer of catalytic particles, which is referred to as a cake layer, is formed on the surface of filtering membrane 31. The grown cake layer increases the filtration resistance, and hence greater pumping power of filtering pump 81 becomes necessary to attain a predetermined filtering flow rate.

Filtering flux J, which is a filtering speed per unit area can be represented by the following (Equation 7) using transmembrane pressure Δp, liquid viscosity η membrane resistance Rm, and cake resistance Rc.

$$J=\Delta p/\eta(Rm+Rc) \quad \text{(Equation 7)}$$

As described above, filtering pump 81 according to the present exemplary embodiment is controlled such that filtering flux J is maintained at a constant value. In this case, liquid viscosity and membrane resistance Rm are constant before and after water treatment. Hence, cake resistance Rc is obtained by transmembrane pressure Δp measured by pressure gage 5.

Further, since cake resistance Rc increases proportionally to thickness □c of the cake layer, the cake layer formed on the surface of filtering membrane 31 reduces filtering flux J. Hence, in order to maintain filtering flux J at a constant value, transmembrane pressure Δp must be increased. In this manner, using the transmembrane pressure of filtering membrane 31 (the difference in pressure between the first chamber and the second chamber of separation tank 3) in addition to concentration of photocatalytic particles in photoreaction tank 2 (c), cause (C), that is, formation of an accumulation layer (cake layer) of the photocatalytic particles on the surface of filtering membrane 31, is identified. That is, with water treatment apparatus 1 according to the present exemplary embodiment, by measuring the catalyst concentration and the transmembrane pressure, the state of the cake layer formed on filtering membrane 31 can be monitored. Note that, increasing the pumping power of filtering pump 81 reduces the power efficiency. That is, in the case where filtering flux J is maintained at a constant value, the lower transmembrane pressure Δp is, the better the power efficiency is.

Further, the formed cake layer can be detached from the surface of filtering membrane 31 by applying vibrations to filtering membrane 31 or generating flow along the surface of filtering membrane 31. With filtering membrane 31 immersed in slurry, detaching the cake layer by agitation with air is well known. An intermittent driving (intermittent operation), i.e., periodically stopping filtering pump 81, is a well-known scheme for reducing suction between filtering membrane 31 and the cake layer. However, the periodically stopping reduces the water treatment efficiency because treatment cannot be performed during stops of filtering pump 81. Addressing thereto, when the water treatment efficiency reduces and cause (C) is identified as the error mode, as the recovery operation process for creating the state where detachment of the cake layer from filtering membrane 31 is facilitated, compressor 9 is caused to intermittently perform an operation of generating air inside separation tank 3 (to perform the intermittent operation). This reduces a reduction in water treatment efficiency associated with the recovery operation process. Note that, during the recovery operation process of compressor 9, filtering pump 81 stops its operation. Further, during the stop of filtering pump 81, introducing pump 11 also stops its operation. This prevents the total amount of slurry stored in water treatment apparatus 1 from changing. Then, after a lapse of a predetermined period, introducing pump 11 and filtering pump 81 start their operations.

On the other hand, in the case of cause (B), that is, when the pores of filtering membrane 31 are clogged with any solid material contained in the primary post-treatment water (when clogging occurs), membrane resistance Rm in (Equation 7) increases and transmembrane pressure Δp rises. In this case, the intermittent operation cannot solve the clogging. In order to lower membrane resistance Rm, the membrane must be cleaned using chemical agents or the like. Accordingly, water treatment apparatus 1 according to the present exemplary embodiment outputs, as the recovery operation process, information on replacement or regeneration of the photocatalytic particles when the water treatment efficiency reduces and cause (B) is identified as the error mode.

Further, upon occurrence of cause (A), that is, when the state of the photocatalytic particles changes and the photocatalytic particles tend to precipitate by coagulation or the like, the photocatalytic particles accumulate at the bottom of water treatment apparatus 1. That is, upon occurrence of cause (A), the concentration of the photocatalytic particles circulating inside water treatment apparatus 1 reduces. In this case also, the intermittent operation cannot solve the reduction in concentration of the photocatalytic particles. The photocatalytic particles must be replaced or regenerated. Accordingly, water treatment apparatus 1 according to the present exemplary embodiment outputs, as the recovery operation process, information on replacement or regeneration of filtering membrane 31 when the water treatment efficiency reduces and cause (A) is identified as the error mode.

As has been described above, when water treatment apparatus 1 continuously operates, a plurality of error modes are expected to occur. These error modes can be determined by measuring the catalyst concentration and the transmembrane pressure. In the following, with reference to FIG. 11, a description will be given of the relationship between the results of the catalyst concentration and the transmembrane pressure, and the error mode determination.

FIG. 11 is a diagram showing an error mode determination table of water treatment apparatus 1 according to the present exemplary embodiment.

That is, when it is determined that catalyst concentration of photocatalytic particles in photoreaction tank 2 (c) is greater than the first threshold value (c>Vct) and transmembrane pressure in the first chamber of separation tank 3 (Δp) is equal to or smaller than the second threshold value (Δp≤Vpt), it can be determined that water treatment apparatus 1 normally operates (no recovery operation process is necessary (corresponding to error mode 0 in FIG. 7).

When it is determined that catalyst concentration of photocatalytic particles in photoreaction tank 2 (c) is greater than the first threshold value (c>Vct) and transmembrane pressure in the first chamber of separation tank 3 (Δp) is greater than the second threshold value (Δp>Vpt), the pores of filtering membrane 31 are clogged with a solid material contained in the primary post-treatment water, that is, filtering membrane 31 is clogged, and it can be determined that the membrane must be replaced or regenerated (corresponding to error mode 1 in FIG. 7).

When it is determined that catalyst concentration of photocatalytic particles in photoreaction tank 2 (c) is equal to or smaller than the first threshold value (c≤Vct) and transmembrane pressure in the first chamber of separation tank 3 (Δp) is equal to or smaller than the second threshold value (Δp≤Vpt), it can be determined that the photocatalytic particles precipitates at the bottom of water treatment apparatus 1 and the catalyst must be replaced or regenerated (corresponding to error mode 2 in FIG. 7).

When it is determined that catalyst concentration of photocatalytic particles in photoreaction tank 2 (c) is equal to or smaller than the first threshold value (c≤Vct) and transmembrane pressure in the first chamber of separation tank 3 (Δp) is greater than the second threshold value (Δp>Vpt), it can be determined that growth of the cake layer is progressing, and the recovery operation process of detaching the cake layer is necessary (corresponding to error mode 3 in FIG. 7).

[Effect and Others]

As has been clarified in the foregoing description, the water treatment apparatus according to the exemplary embodiment of the present disclosure enables to efficiently determine errors occurring in a continuous operation of the water treatment apparatus by measuring the catalyst concentration and the transmembrane pressure, and to perform an appropriate process for maintaining a constant concentration of the photocatalytic particles so that the water treatment efficiency is maintained during the continuous operation.

That is, water treatment apparatus 1 according to the present exemplary embodiment includes photoreaction tank 2 that purifies contaminated water with a fluidized bed of photocatalytic particles, and separation tank 3 that separates the primary post-treatment water and the photocatalytic particles from each other with filtering membrane 31. Water treatment apparatus 1 determines an error mode of water treatment apparatus 1 based on two kinds of measurement result obtained with a mechanism that measures a differential pressure applied on filtering membrane 31 and a mechanism that measures light transmittance of slurry containing the photocatalytic particles, and performs a proper recovery operation process. Accordingly, by measuring the catalyst concentration and the transmembrane pressure, an error that occurs in a continuous operation of water treatment apparatus 1 can be efficiently determined, and a proper recovery operation process can be performed.

Figure 12:
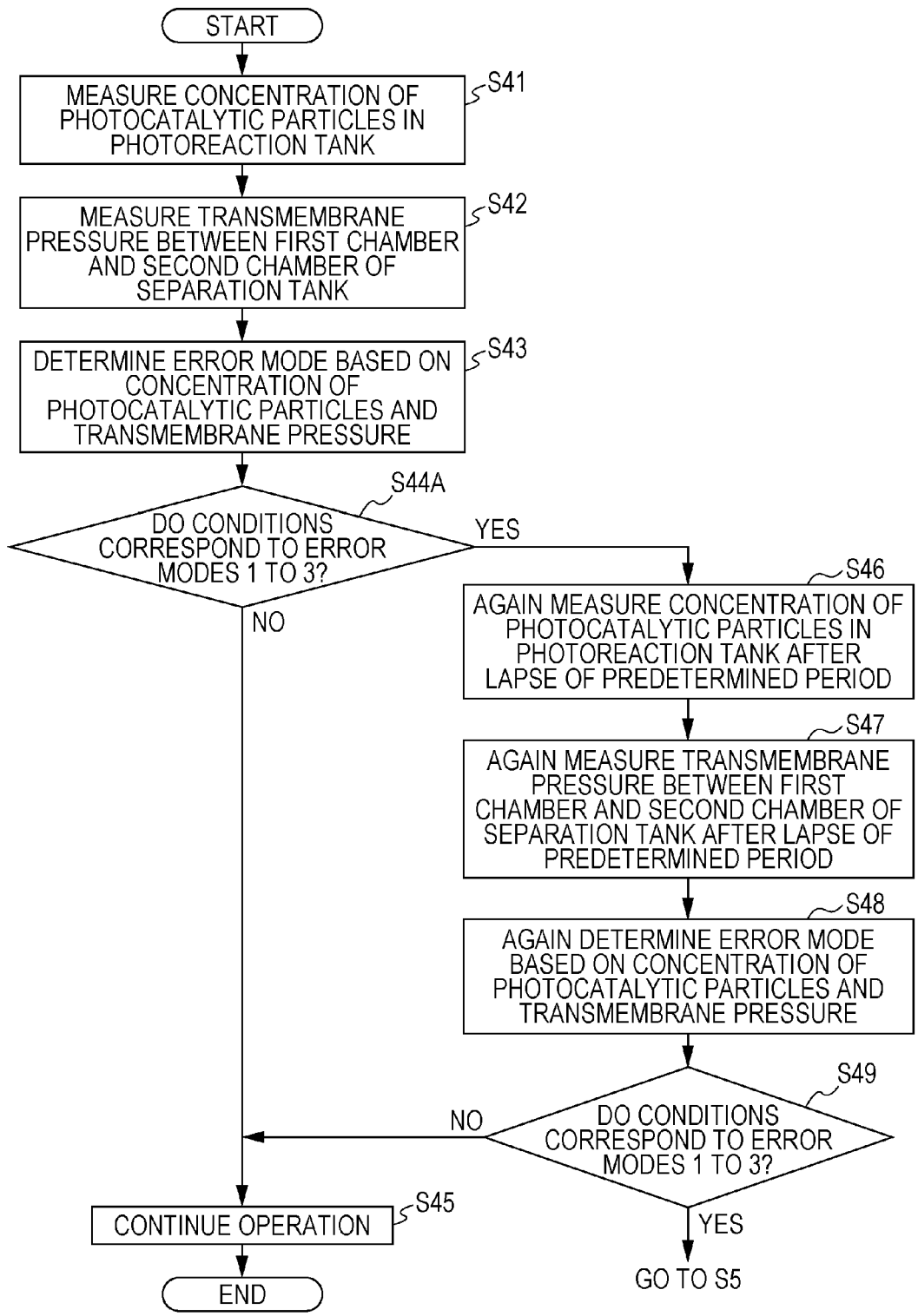
FIG. 12 is a diagram showing other exemplary error determination flow of the water treatment apparatus according to the exemplary embodiment.

Note that, in Step S44 in FIG. 6, though it has been described that water treatment apparatus 1 determines an error mode of water treatment apparatus 1 based on the concentration of the photocatalytic particles in photoreaction tank 2 and the difference in pressure between the first chamber and the second chamber of separation tank 3, that is, based on the measurement values obtained at a single time point, the present disclosure is not limited thereto. The cause may not be correctly identified as one of error modes 1 to 3 shown in FIG. 7 just based on the measurement values obtained at the single time point, depending on the setting of the first threshold value and the second threshold value. In this case, as shown in FIG. 12, an error mode of water treatment apparatus 1 should be determined based on the measurement values obtained twice, i.e., including measurement values again obtained after a lapse of a predetermined period. In the following, this is specifically described with reference to FIG. 12.

FIG. 12 is a diagram showing other exemplary error determination flow of water treatment apparatus 1 according to the present exemplary embodiment. Note that, the elements similar to those in FIG. 6 are denoted by identical reference characters, and the detailed description thereof will not be repeated.

In S44A, water treatment apparatus 1 determines an error mode of water treatment apparatus 1 based on the concentration of photocatalytic particles in photoreaction tank 2 and the difference in pressure between the first chamber and the second chamber of separation tank 3.

In S44A, when the conditions correspond to error modes 1 to 3 (Yes in S44A), the processes of Steps S46 to S49 are performed after a lapse of a predetermined period, e.g., 30 minutes or one hour. That is, water treatment apparatus 1 again measures the concentration of the photocatalytic particles in photoreaction tank 2 after a lapse of a predetermined period (S46), and again measures the difference in pressure between the first chamber and the second chamber of separation tank 3, that is, the pressure applied on filtering membrane 31 (the transmembrane pressure), after a lapse of a predetermined period (S47). Note that, Step S46 and Step S47 may be performed reversely or simultaneously. Subsequently, water treatment apparatus 1 determines an error mode of water treatment apparatus 1 based on the concentration of the photocatalytic particles in photoreaction tank 2 and the difference in pressure between the first chamber and the second chamber of separation tank 3 (S48). Then, when the conditions correspond to error modes 1 to 3 (Yes in S49), water treatment apparatus 1 determines that the recovery operation process is necessary (Yes in S4 in FIG. 4), and performs a recovery operation process corresponding to any of the error modes shown in FIG. 7 (S5).

Note that, in S44A or S48, when the conditions do not correspond to error modes 1 to 3 (No in S44A or S49), water treatment apparatus 1 continues its operation similarly to the manner in FIG. 6 (S45).

In the foregoing, while the description has been given of the water treatment method and water treatment apparatus 1 in one or more modes of the present disclosure based on an exemplary embodiment, the present disclosure is not limited to this exemplary embodiment. One or more modes of the present disclosure may include a mode in which various modifications contemplated by a person skilled in the art are applied to the present exemplary embodiment, and a mode in which constituents of different exemplary embodiments are combined, unless they depart from the spirit of the present disclosure.

For example, in the exemplary embodiment, all or part of the units or devices, or all or part of the functional blocks of the block diagrams of FIGS. 2 and 3 may be implemented by a semiconductor device, or one or more electronic circuits including a semiconductor integrated circuit (IC) or a large scale integration (LSI). The LSI and the IC may be integrated on one chip, or may be structured by a combination of a plurality of chips. For example, the functional blocks other than a memory element may be integrated on one chip. The LSI and the IC as used herein are called by other names depending on the extent of integration, and may be referred to as a system LSI, a very large scale integration (VLSI), or an ultra large scale integration (ULSI). A Field Programmable Gate Array (FPGA) programmed after manufacture of the LSI, or a reconfigurable logic device with which the connections inside the LSI can be reconfigurable or circuit partitions inside the LSI can be set up can also be used for the same purpose. For example, determiner 61 is composed of a processor and at least one memory. The at least one memory memorizes a program of the processing flow shown in FIG. 6. The program memorized in the memory is performed by the processor.

Further, all or part of the functions and operations of units, apparatuses, or part of apparatuses can be executed by software processing. In this case, the software is recorded on one or more non-transitory computer-readable recording media such as ROMs, optical discs, and hard disk drives. When the software is executed by a processing apparatus (processor), the software causes the processing apparatus (processor) and peripheral devices to execute particular functions in the software. The systems or the apparatuses may include one or more non-transitory computer-readable recording media recording the software, the processing apparatus (processor), and any required hardware device such as an interface.

The present disclosure can be used for a water treatment method, a water treatment apparatus, and a non-transitory computer-readable recording medium storing a program, each of which achieves high reaction efficiency and capable of performing a long-period continuous operation.

REFERENCE SIGNS LIST 1 water treatment apparatus
2 photoreaction tank
3 separation tank
4 catalyst concentration meter
5 pressure gage
6 recovery operation processor
7 channel
8 returning passage
9 compressor
11 introducing pump
12 introducing flowmeter
21 light source
22 water level gauge
23 contaminated water inlet
24 first outlet
25 first inlet
31 filtering membrane
32 second inlet
33 second outlet
34 treated water outlet
41 concentration measurement-purpose light source
42 illuminometer
43 calculator
61 determiner
62 memory
63 output unit
71 circulating pump
72 circulation flowmeter
81 filtering pump
82 filtering flowmeter

What is claimed is:

1. A water treatment method using a water treatment apparatus that treats impurities, the method comprising:
  (a) providing the water treatment apparatus including:
    a first tank that stores slurry containing photocatalytic particles;
    a light source that irradiates the photocatalytic particles with ultraviolet light within the first tank;
    a channel;
    a second tank that is connected to the first tank via the channel, the second tank comprising a first chamber and a second chamber inside thereof;
    a filtering pump that reduces pressure in the first chamber;
    a catalyst concentration meter that measures concentration of the photocatalytic particles in the first tank;
    a first pressure gage that measures the pressure in the first chamber;
    a second pressure gage that measures pressure in the second chamber;
    a compressor that supplies air to the first tank and the second chamber of the second tank; and
    electric circuitry, wherein:
    the second tank comprises a filtering membrane; and
    a boundary between the first chamber and the second chamber is at least partially formed by the filtering membrane in such a manner that the first chamber is surrounded by the second chamber;
  (b) introducing an aqueous solution containing impurities into the first tank;
  (c) irradiating, from the light source, the photocatalytic particles with ultraviolet light, to turn the aqueous solution into primary treated water with which the impurities have been treated;
  (d) filtrating the primary treated water with the filtering membrane while air is supplied at a first flow rate from the compressor to the second chamber of the second tank and the first chamber is depressurized with the filtering pump, so that the primary treated water is separated into the photocatalytic particles remained on the filtering membrane and secondary treated water which has passed through the filtering membrane and flowed into the first chamber, wherein the secondary treated water does not contain the photocatalytic particles;
  (e) measuring the concentration of the photocatalytic particles in the first tank, the pressure in the first chamber, and the pressure in the second chamber; and
  (f) determining, by the electric circuitry, whether or not a first requirement is satisfied that the concentration of the photocatalytic particles is not more than a first threshold value and that a difference between the pressure in the first chamber and the pressure in the second chamber is greater than a second threshold value; and
  (g) supplying the air at a second flow rate of not less than the first flow rate from the compressor to the second chamber of the second tank, when the first requirement is satisfied.

2. The water treatment method according to claim 1, wherein
  the second flow rate is equal to the first flow rate; and
  in the step (g), the first chamber is not depressurized.

3. The water treatment method according to claim 1, wherein
  the steps (e) and (f) are repeated, when the first requirement is not satisfied in the step (f).

4. The water treatment method according to claim 1, further comprising the following step after the step (e):
  (f2) determining whether or not a second requirement is satisfied that the concentration of the photocatalytic particles is not more than the first threshold value and that the difference between the pressure in the first chamber and the pressure in the second chamber is equal to or smaller than the second threshold value.

5. The water treatment method according to claim 1, further comprising the following step after the step (e):
  (f3) determining whether or not a third requirement is satisfied that the concentration of the photocatalytic particles is greater than the first threshold value and that the difference between the pressure in the first chamber and the pressure in the second chamber is greater than the second threshold value.

6. The water treatment method according to claim 1, wherein
the water treatment apparatus further includes a flowmeter that measures a flow rate of the secondary treated water being discharged, the method further comprising
controlling the filtering pump so that the flow rate is maintained at a constant value based on the flow rate from the flowmeter.

7. The water treatment method according to claim 1, wherein
the compressor supplies the air in such a manner that the supplied air flows through the inside of the second chamber to the filtering membrane.

8. A water treatment apparatus comprising:
a first tank that stores an aqueous solution containing impurities and slurry containing photocatalytic particles that treat the impurities, the photocatalytic particles treating the impurities to turn the aqueous solution into primary treated water;
a light source that irradiates the photocatalytic particles with ultraviolet light within the first tank;
a channel;
a second tank that is connected to the first tank via the channel, the second tank comprising a first chamber and a second chamber inside thereof;
a filtering pump that reduces pressure in the first chamber;
a catalyst concentration meter that measures concentration of the photocatalytic particles in the first tank;
a first pressure gage that measures the pressure in the first chamber;
a second pressure gage that measures pressure in the second chamber;
a compressor that supplies air to the first tank and the second chamber of the second tank; and
electric circuitry, wherein:
the second tank comprises a filtering membrane,
a boundary between the first chamber and the second chamber is at least partially formed by the filtering membrane in such a manner that the first chamber is surrounded by the second chamber, and
the electric circuitry configured to:
acquire the concentration of the photocatalytic particles in the first tank, the pressure in the first chamber, and the pressure in the second chamber;
determine whether or not a first requirement is satisfied that the concentration of the photocatalytic particles is not more than a first threshold value and that a difference between the pressure in the first chamber and the pressure in the second chamber is greater than a second threshold value; and
output an operation signal for supplying the air at a second flow rate of not less than the first flow rate from the compressor to the second chamber of the second tank, when the first requirement is satisfied.

9. The water treatment apparatus according to claim 8, wherein
the electric circuitry repeats the acquirement and the determination after a lapse of a predetermined period, when the first requirement is not satisfied.

10. The water treatment apparatus according to claim 8, further comprising:
a flowmeter that measures a flow rate of the secondary treated water being discharged; and a filtering pump controller that receives the flow rate from the flowmeter and controls the filtering pump so that the flow rate is maintained at a constant value.

11. A water treatment apparatus comprising:
a first tank that stores an aqueous solution containing impurities and slurry containing photocatalytic particles that treat the impurities, the photocatalytic particles treating the impurities to turn the aqueous solution into primary treated water;
a light source that irradiates the photocatalytic particles with ultraviolet light within the first tank;
a channel;
a second tank that is connected to the first tank via the channel, the second tank comprising a first chamber and a second chamber inside thereof;
a filtering pump that reduces pressure in the first chamber;
a catalyst concentration meter that measures concentration of the photocatalytic particles in the first tank;
a first pressure gage that measures the pressure in the first chamber;
a second pressure gage that measures pressure in the second chamber;
a compressor that supplies air to the first tank and the second chamber of the second tank; and
electric circuitry, wherein:
the second tank comprises a filtering membrane,
a boundary between the first chamber and the second chamber is at least partially formed by the filtering membrane in such a manner that the first chamber is surrounded by the second chamber, and
the electric circuitry is configured to:
acquire the concentration of the photocatalytic particles in the first tank, the pressure in the first chamber, and the pressure in the second chamber; and
output one of the information on replacement of the photocatalytic particles and the information on regeneration of the filtering membrane on the basis of the concentration of the photocatalytic particles in the first tank, the pressure in the first chamber, and the pressure in the second chamber.

12. The water treatment apparatus according to claim 11, wherein
the electric circuitry is configured to:
acquire the concentration of the photocatalytic particles in the first tank, the pressure in the first chamber, and the pressure in the second chamber at a first time;
further acquire the concentration of the photocatalytic particles in the first tank, the pressure in the first chamber, and the pressure in the second chamber at a second time after a lapse of a predetermined period from the first time; and
output one of the information on replacement of the photocatalytic particles and the information on regeneration of the filtering membrane on the basis of the concentration of the photocatalytic particles in the first tank, the pressure in the first chamber, and the pressure in the second chamber acquired at the first time and the second time.

13. The water treatment apparatus according to claim 11, wherein
the electric circuitry is configured to:
determine whether or not a second requirement is satisfied that the concentration of the photocatalytic particles is not more than the first threshold value and that the difference between the pressure in the first chamber and the pressure in the second chamber is equal to or smaller than the second threshold value; and output information on replacement of the photocatalytic particles, when the second requirement is satisfied.

14. The water treatment apparatus according to claim 11, wherein the circuitry is configured to:

determine whether or not a third requirement is satisfied that the concentration of the photocatalytic particles is greater than the first threshold value and that the difference between the pressure in the first chamber and the pressure in the second chamber is greater than the second threshold value; and output information on regeneration of the filtering membrane, when the third requirement is satisfied.

* * * * *